Jan. 2, 1945. J. W. BRIDWELL ET AL 2,366,433
CONTROL MECHANISM
Filed July 27, 1942 6 Sheets-Sheet 5

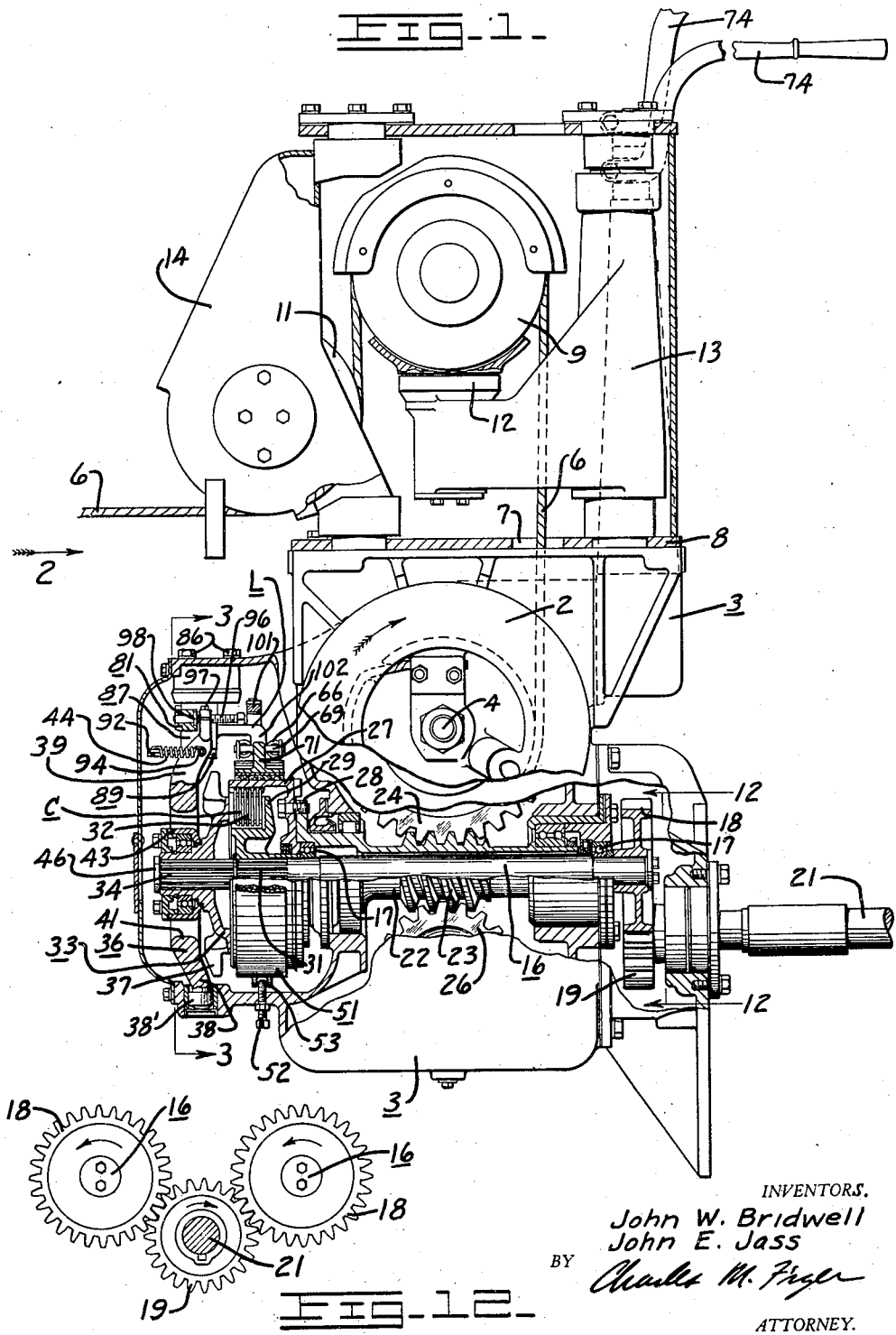

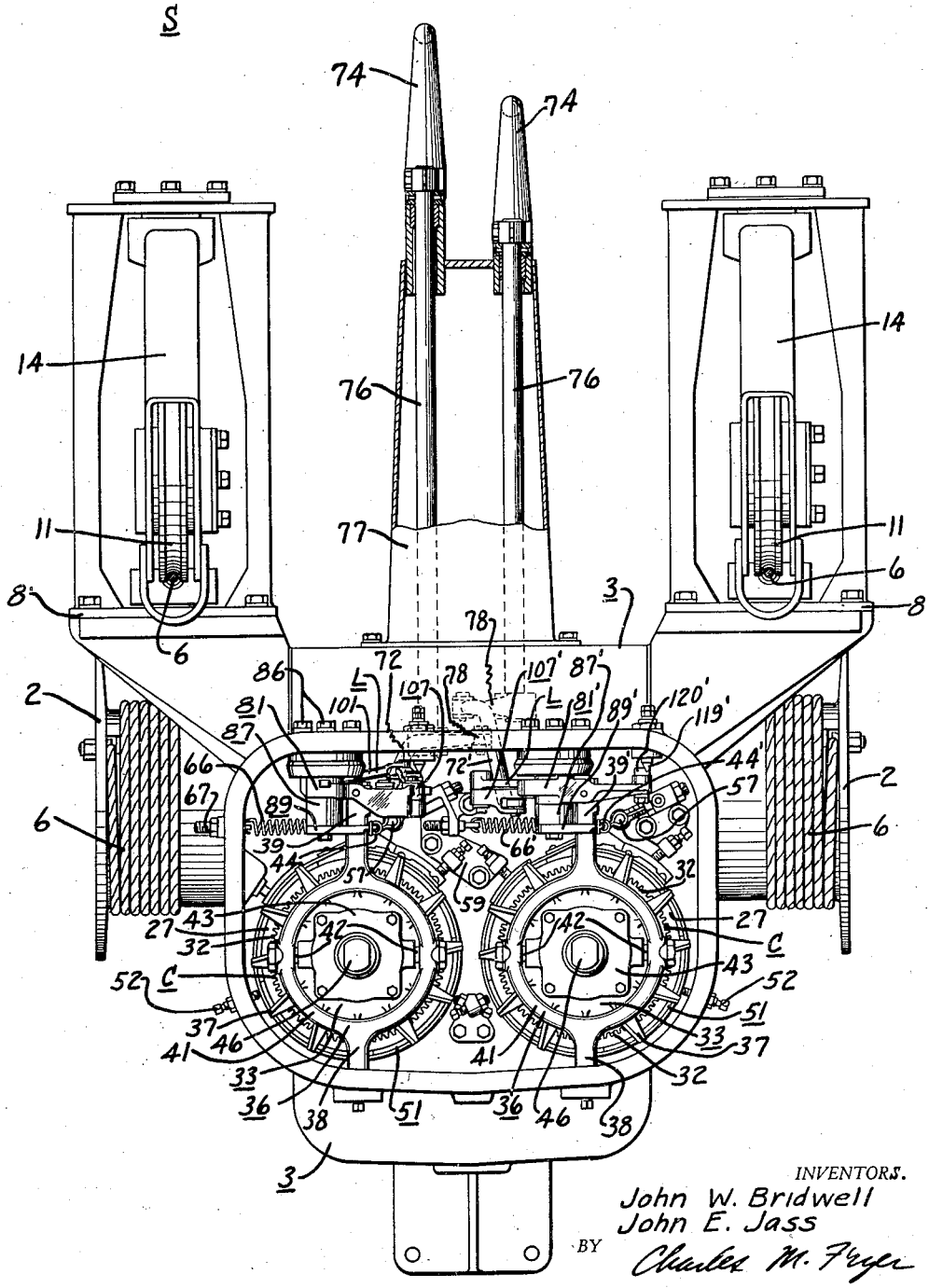

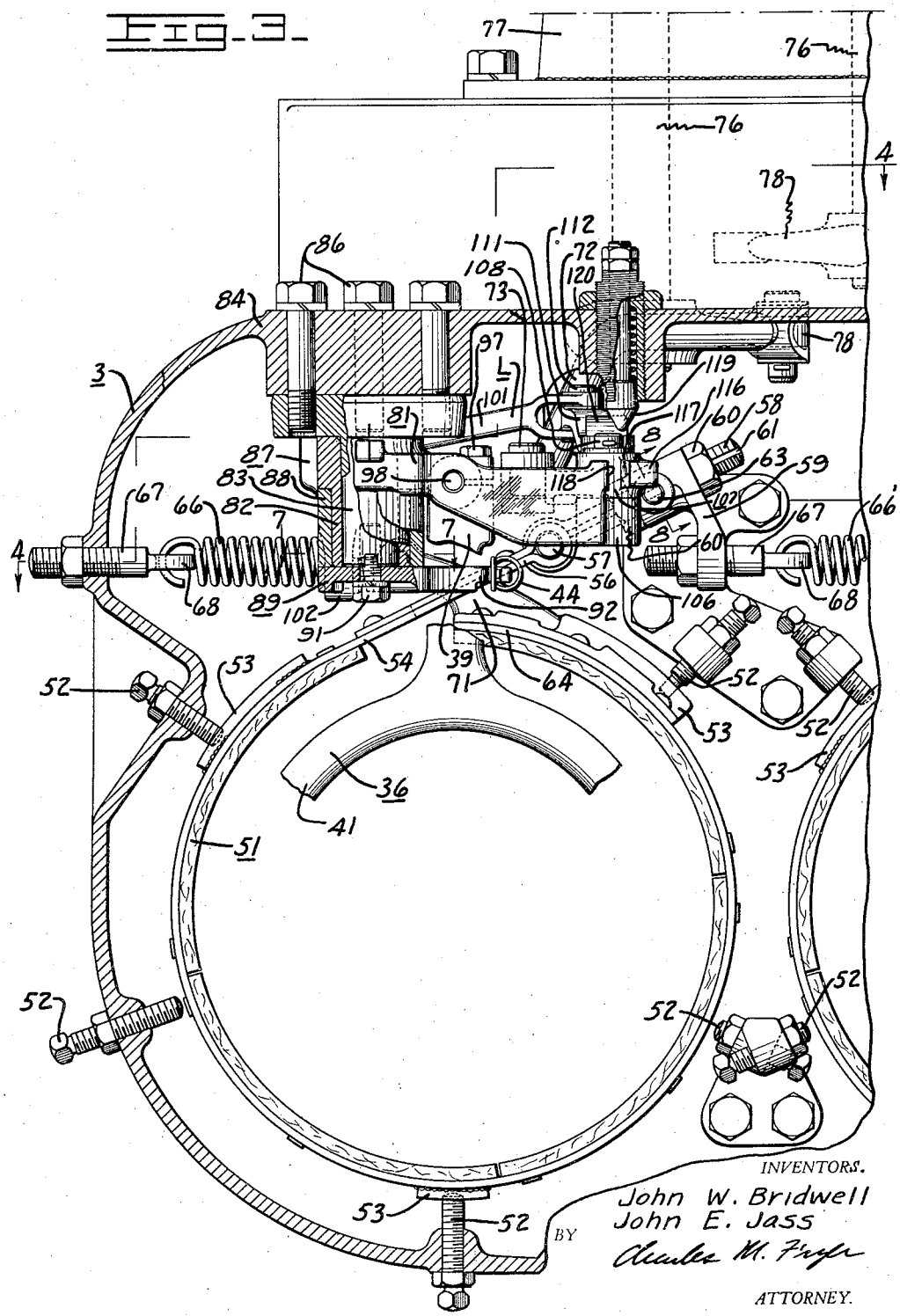

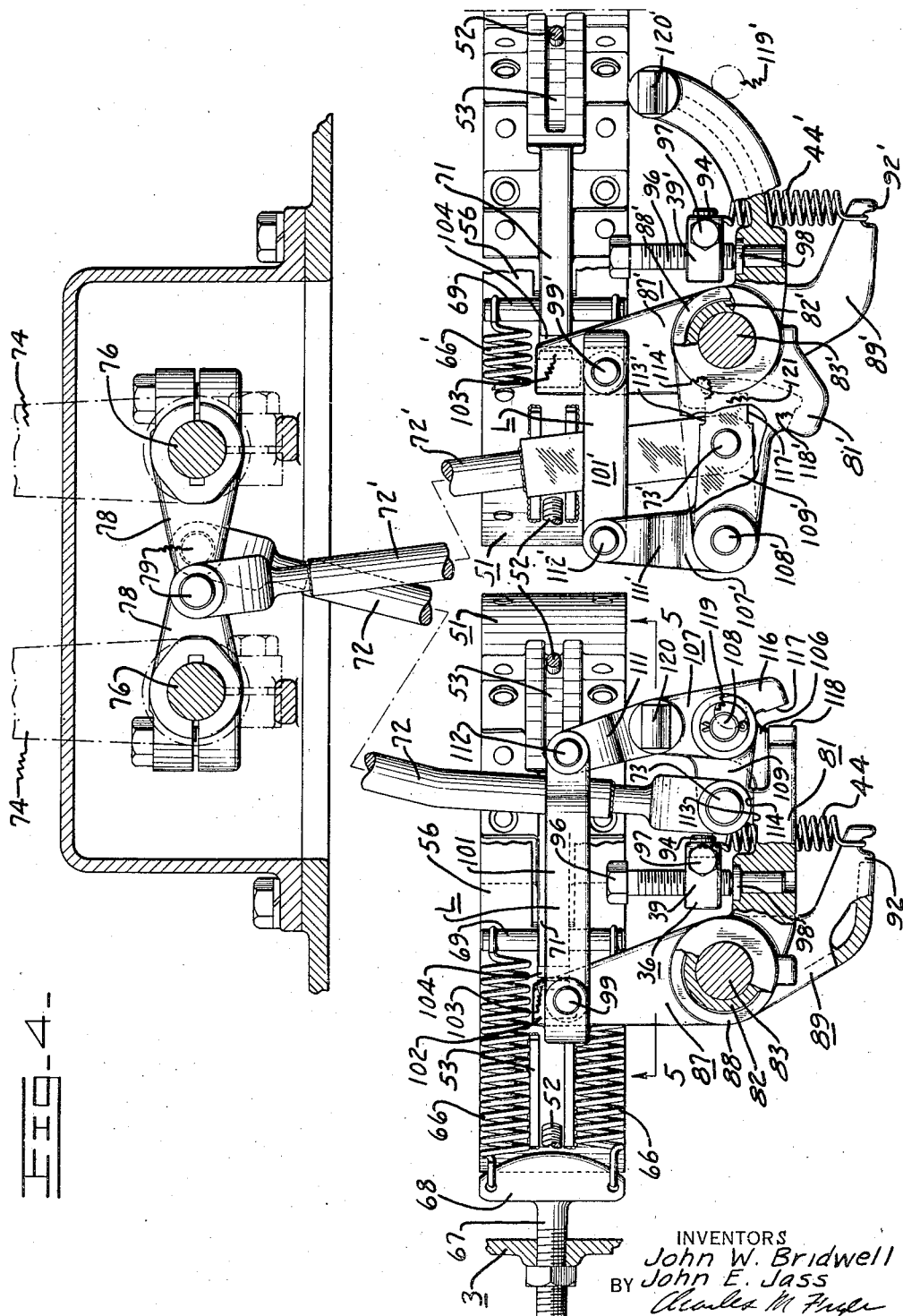

INVENTORS
John W. Bridwell
BY John E. Jass
Charles M. Frye
ATTORNEY

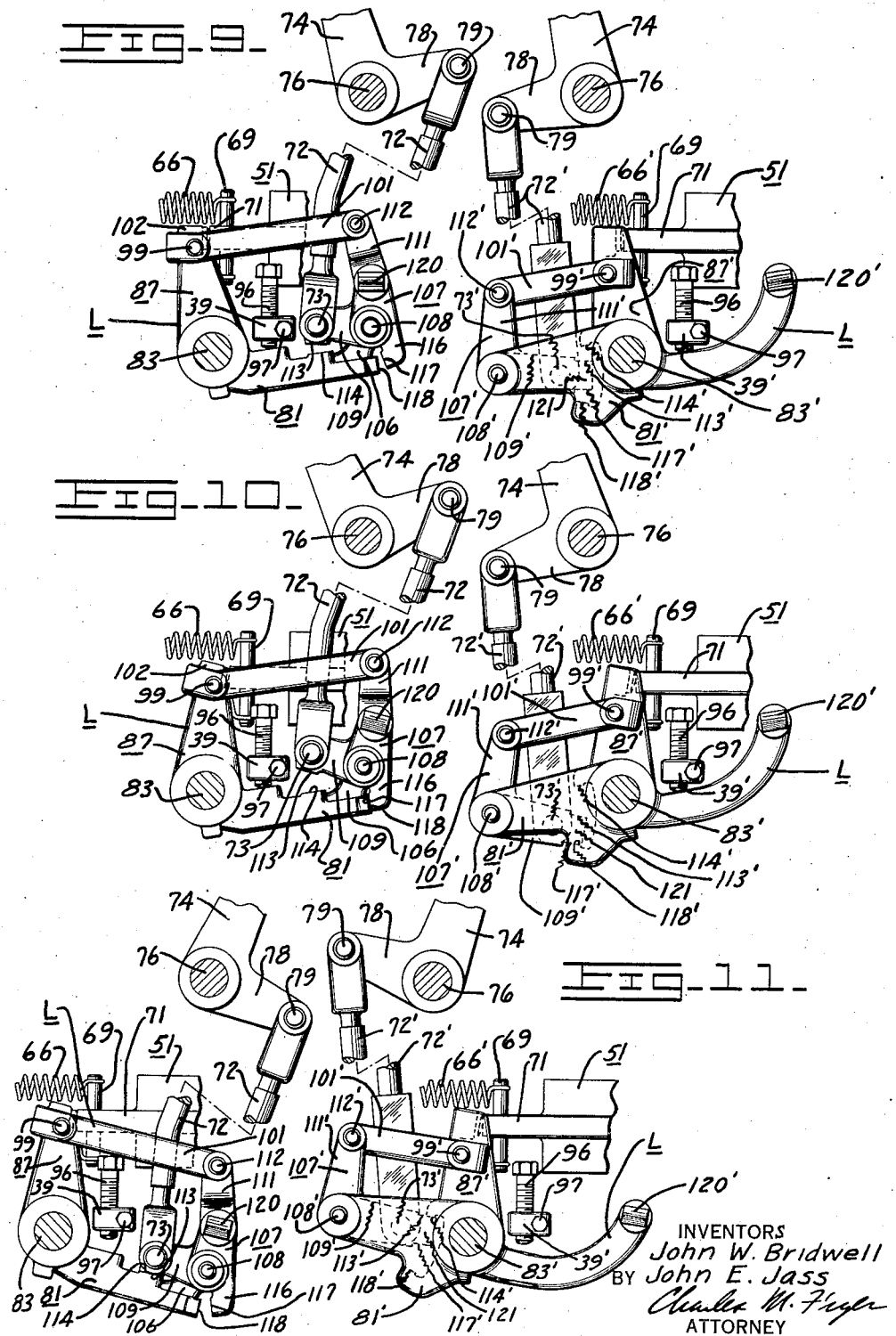

Patented Jan. 2, 1945

2,366,433

UNITED STATES PATENT OFFICE 2,366,433

CONTROL MECHANISM

John W. Bridwell and John E. Jass, Peoria, Ill., assignors to Caterpillar Tractor Co., San Leandro, Calif., a corporation of California Application July 27, 1942, Serial No. 452,544

11 Claims. (Cl. 192—17)

Our invention relates to control mechanism, and more particularly to mechanism adapted to perform a sequence of operations when actuated by a control member upon movement of the control member in one direction, and only some of such operations when the control member is moved in another direction.

Such control mechanism is described herein in association with a form of power controlled hoist unit wherein we have found our mechanism to have special applicability, but it is to be understood that our mechanism may be employed in any other environment where analogous operations are required, as will be apparent as the description proceeds. The power control unit is adapted to be mounted on a tractor, deriving power from the power take-off of the tractor, and includes a drum for winding and unwinding a cable. Usually, when adapted for manipulation of a common form of cable controlled earth carrying scraper adapted to be drawn by the tractor as a trailer vehicle, the unit includes a pair of drums, the cables of which are operated to control movements of various elements of the scraper. Such double drum hoisting mechanism is disclosed herein.

As is customary, each drum is associated with both a brake, and drive interrupting and establishing mechanism in the form of a suitable clutch. The clutch is adapted to be engaged to drive the drum in one direction for winding up of the cable to raise a load connected thereto. For holding the load in any adjusted position when the clutch is disengaged, the brake holds the drum; and lowering of the load is effected by gravity, or free spooling out of the cable from the drum, upon release of the brake. Thus, it is seen that with the parts in neutral position, i. e., the load being neither raised nor lowered, the brake holds the drum. For convenience of manipulation by the operator of the tractor, it is desirable to have only a single control handle for imparting the described operations to the clutch and the brake; such control handle being movable in one direction for raising the load and movable in an opposite direction to release the brake so that the load may lower under the effect of gravity.

When a drive is imparted to the drum for raising the load, it is desirable for best results, that the brake be positively released when the clutch is first engaged. Otherwise, undue wear on the brake will occur. Also, the brake should not be released until the clutch is substantially fully engaged. Otherwise, slippage will occur during the act of initiating driving of the drum which is undesirable, as this causes undue strain on the parts. Heretofore, considerable difficulty has been encountered in the provision of control mechanism which will positively release the brake just after the clutch is engaged for driving the drum. Self-unwrapping types of brake mechanism have been employed which, when the drum is being driven, tend to release themselves by rotation of the drum in one direction, and which when the clutch is disengaged automatically grab the drum. However, even with such type of brake mechanism, it is apparent that during driving of the drum, considerable frictional drag will obtain, resulting in loss of power, excessive wear of the brake, and generation of heat which renders the problem of proper lubrication difficult.

Our invention is designed to obviate the foregoing described difficulties encountered with a self-unwrapping brake in mechanism of the character described, and has as its objects among others, the provision of improved control mechanism especially adapted for association in the environment related which: can be manipulated by a single control member movable in one direction from a neutral position, to release the brake positively when the clutch is engaged for driving the drum; will positively release such brake just after the clutch is engaged, and when the control member is returned to the neutral position, apply the brake just before the clutch is disengaged; will release only the brake upon movement of the control member in another direction from such neutral position to allow lowering of the load under the effect of gravity; and which is of relatively simple and economical construction. Other objects of our invention will become apparent from a perusal of the following description thereof.

Referring to the drawings:

Fig. 1 is a side elevation of a form of power controlled hoist unit embodying the control mechanism of our invention; parts being broken away, and in section to disclose more clearly the construction.

Fig. 2 is a rear elevation looking in the direction of arrow 2 in Fig. 1; parts being broken away, and omitted from the view to illustrate more clearly the construction.

Fig. 3 is an enlarged vertical section of the left-hand portion of the structure shown in Fig. 2, taken in a plane indicated by line 3—3 in Fig. 1; portions of the structure being omitted from the view and other portions being shown broken away for the purpose of illustrating the construction more clearly.

Fig. 4 is a fragmentary horizontal sectional elevation, taken in planes indicated by line 4—4 in Fig. 3; portions of the structure being omitted from the view and other portions being shown in section for the purpose of illustrating the construction more clearly.

Fig. 9 is a horizontal view of the control mechanism of our invention, illustrating the position which it assumes substantially at the time the clutch is fully engaged and the brake just about to be released; the linkage connection to the control mechanism being shown more or less schematically.

Fig. 10 is a view similar to Fig. 9, illustrating the control mechanism in the position which it assumes when the brake is completely released and the clutch is engaged.

Fig. 11 is a view similar to Figs. 9 and 10, illustrating the position which the control mechanism of our invention assumes when the clutch is disengaged and the brake completely released.

Fig. 12 is a fragmentary end view, taken in a plane indicated by line 12—12 in Fig. 1.

Figure 7:
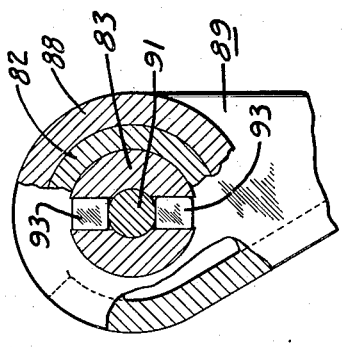
Fig. 7 is a fragmentary horizontal section, taken in a plane indicated by line 7—7 in Fig. 3; portions of the structure being broken away to illustrate the construction more clearly.
Figure 8:
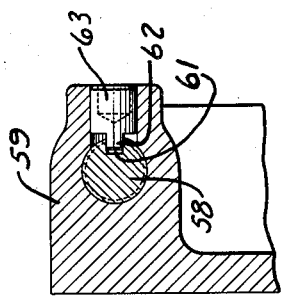
Fig. 8 is a fragmentary section, taken in a plane indicated by line 8—8 in Fig. 3.

In the form of control unit illustrated, a pair of cable winding and unwinding drums 2 is supported for independent rotation on a housing structure 3, about laterally extending axis 4; a suitable bearing structure being provided for journalling each drum. Wound about each drum 2 is a cable 6 which passes upwardly through an aperture 7 in a horizontal wall portion 8 in housing structure 3, over a pulley 9, and under a pulley 11, which pulleys form part of a fair-lead structure for directing cable 6 properly as it winds and unwinds from the drum. Pulley 9 is journalled on a bracket 12, journalled for rotation about a vertical axis, on another bracket 13 which is in turn journalled on housing structure 3 for movement about a vertical pivotal axis. Pulley 11 is also journalled on a bracket 14 in turn journalled for pivotal movement about an upright axis, on housing structure 3. Fair-lead arrangements to guide the cable properly are well known in the art; the form shown being chosen for purposes of illustration.

Means is provided for positively driving each drum 2 in a clockwise direction, with reference to Fig. 1 as is indicated by the direction arrow, to raise the load to which cable 6 is connected; the drum being adapted to rotate freely in an opposite direction under gravity action of the load to allow playing out of the cable for lowering of the load. Such driving means includes drive interrupting and establishing mechanism in the form of a clutch, and may assume any suitable form. The preferred form illustrated comprises a pair of longitudinally extending shafts 16 journalled in suitable bearings 17, and projecting longitudinally beyond such bearings. Secured to the front end of each shaft 16 is a gear 18 meshing with a common driving pinion 19 driven from the power take-off shaft 21 of the tractor against the rear of which housing structure 3 is adapted to be detachably secured. Usually, power take-off shaft 21 is driven continuously so that gears 18 and the associated shafts 16 are constantly driven.

Journalled about each shaft 16 is a sleeve 22 having worm 23 integral therewith and meshing with a worm wheel 24 secured for rotation with each drum 2. Each worm 23 also meshes with an oil thrower wheel 26 adapted to supply lubricant contained in the bottom of housing structure 3. A suitable clutch structure C is interposed between each shaft 16 and each sleeve 22 about such shaft, which when engaged will transmit a drive from shaft 16 to sleeve 22, and thus to the associated drum 2. In the embodiment of the invention illustrated, each clutch C comprises an outer brake drum part 27 secured through flange connection 28 to sleeve 22, and an inner clutch part 29 secured for rotation to shaft 16 by splined connection 31; part 29 being immovable axially on such shaft 16. Customary, spaced clutch plates 32 are mounted for axially slidable movement in suitable teeth on drum part 27 and are interposed between similarly mounted clutch plates on inner clutch part 29. When the clutch plates are pressed into engagement, drum part 27 will be frictionally locked to part 29, to cause rotation of sleeve 22.

A pressure plate 33 splined for axially slidable movement on a rearwardly projecting end portion 34 of each shaft 16 is adapted to be moved forwardly by a clutch yoke member 36 for effecting pressure engagement of clutch plates 32, and consequent engagement of the clutch. In this connection, suitable cooling fins 37 are provided about the periphery of pressure plate 33 for dissipating heat resulting from frictional engagement of clutch plates 32. Each yoke member 36 comprises a lower leg portion 38 having a vertically slidable pivotal connection 38' in a lower wall of housing structure 3, an upper leg portion 39, and an intermediate collar portion 41. Extending laterally from diametrically opposite points of collar portion 41 is a pair of pins 42 freely engaging a bearing cage 43 in which is journalled pressure plate 33; such bearing cage being connected in any suitable manner to the pressure plate, so as to be immovable axially with respect thereto.

As a result, when yoke member 36 is moved forwardly, pressure plate 33 will be similarly moved to effect engagement of the clutch; and when the clutch is completely engaged, further forward movement of the yoke member 36 is precluded by virtue of the stop provided when clutch plates 32 are pressed together. Thus, engagement of the clutch serves as a stop, limiting forward movement of yoke member 36 which, in cooperation with the control mechanism of our invention, accomplishes a purpose to be subsequently described. Rearward movement of yoke member 36 is effected by a return spring 44 connected to upper leg portion 39 of the yoke member; the rear position of movement of yoke member 36 being determined by stop flange 46 secured to the rear end of shaft 16. From the preceding, it will be apparent that engagement of the clutch through any suitable control member is effected against the action of spring 44; and when such control member is released, spring 44 will automatically cause the clutch to become completely disengaged by relieving frictional drag on clutch plates 32.

Means, in the form of brake mechanism, is provided to hold each of drums 2 fixedly in position when the clutch is disengaged, so that the load connected to the associated cable 6 may be held at any desired position, such means being releasable to allow the lowering of the load by gravity. The brake mechanism comprises a brake band 51 associated with each drum part 27 of clutch C and having a floating mounting about the drum 27 by virtue of a plurality of adjustable supporting pins 52 about the periphery of the band; some of such pins 52 being adapted to engage in suitable guideways 53 for the purpose of precluding axial displacement of the band. One end 54 of each brake band 51 is anchored to housing structure 3, by means of a strap 56 pivotally connected at 57 to an anchoring pin 58 adjustably mounted in a suitable bracket 59 secured to housing structure 3; nuts 60 being provided to lock anchoring pin 58 in adjusted position. To preclude turning of the anchoring pin when it is adjusted, it is formed with an axially extending slot 61 engaging a key 62 formed on a pin 63 pressed in bracket 59. Thus, when nuts 60 are turned in either one of opposite directions, anchoring pin 58 will be moved depending upon the direction of movement of the nuts, to adjust the anchored position of end 54 of the band. In this connection, the opposite end 64 of the band is resiliently pulled by spring means 66 in a direction to cause the band to engage normally drum 27; the spring means acting against anchoring pin 58.

Each of spring means 66 preferably comprises a pair of springs; the springs for the left-hand brake of the unit being adjustably anchored at one end to housing structure 3 by means of adjustable pin 67, having anchoring cross-bar 68 to which the springs are secured; and at the opposite end, such springs are anchored to a cross pin 69 carried in the end of a bracket 71 secured to opposite end 64 of the band 51. The springs for the right-hand brake band 51 are similarly connected to such band at one end but at the opposite end they are anchored indirectly to housing structure 3 by means of the previously mentioned bracket 59 for the left-hand unit. From the preceding, it is seen, that although the action of spring means 66 is such as to maintain the brake mechanim engaged, the brake mechanism may be actuated to released position by moving end 64 of the brake band against the action of such resilient or spring means 66.

Manipulation of clutch C and the brake mechanism is effected through a special control linkage system L of our invention, which will be subsequently described in greater detail. Each linkage system L is manipulatable through actuating linkage comprising an axially movable control rod 72, the rear end of which is pivotally connected at 73 to linkage L. When rod 72 is moved in one direction from a neutral position, i. e., the position which it assumes with the brake engaged and the clutch disengaged, linkage L causes clutch C to become engaged; and then just after the clutch is engaged, it causes the brake to become positively released. Hence, drum 2 is driven to raise the load, without drag on the brake. Movement of rod 72 in an opposite direction from such neutral position effects positive release of the brake, without engagement of the clutch, to allow spooling out of the cable with consequent lowering of the load by gravity. Thus, the control linkage L actuates a plurality of devices in sequence when control member 72 is moved in one direction from a neutral position, and actuates a lesser number of such devices when the control member is moved in an opposite direction from such neutral position.

Actuation of rods 72 is effected by a pair of adjacent, manually manipulatable control handles 74 which are positioned just to the right and slightly to the rear of the operator's station on the tractor (indicated by reference letter S in Fig. 2), so as to be readily accessible to the operator. Each of control handles 74 is secured to an upright shaft 76 journalled for turning movement in a bracket housing 77 secured to housing structure 3; the handles 74 being arranged at different levels to avoid interference when they are manipulated. Fixedly connected to the lower end of each shaft 76 is a lever 78 pivotally connected at 79 to the front end of an associated rod 72. For purposes of symmetry and conservation of space, levers 78 connected to the bottom ends of shafts 76 preferably extend laterally toward each other in overlapping relationship. Thus, when each control handle 74 is turned in either one of opposite directions, the associated control rod 72 will be moved in either one of opposite directions to actuate the associated control linkage L.

To facilitate operation by the operator of the tractor, it is desirable that turning of each control handle 74 in a like direction produce the same effect on the associated clutch and brake mechanism, as determined by the associated control linkage L. However, since levers 78 extend toward each other, control rods 72 will be moved in opposite directions for the same direction of movement of control handles 74. Therefore, the control linkage mechanisms L of our invention are of slightly different construction, although their principle of construction is the same, for the purpose of permitting control handles 74 to perform the same operations on each of the associated clutches and brakes for the same direction of movement thereof. The linkages L merely differ from each other by being left and right hand linkages; and for explanation of the principle of such linkage construction, the left-hand linkage L will now be described.

Such left-hand control linkage system L comprises a rear transversely extending lever 81 having a hub 82 journalled for pivotal movement about fixed stub shaft 83 secured to an upper wall 84 of housing structure 3, by means of cap screws 86. Journalled for pivotal movement about the same pivot axis of lever 81 is a left longitudinally extending guide arm 87 having hub 88 journalled for rotation about hub 82; such assembly being held together by a bracket plate 89 fixedly secured to stub shaft 83 by cap screw 91. Bracket plate 89 has a rearwardly extending anchoring lug 92 which serves as one anchor for the previously described spring 44 which serves to urge clutch yoke member 36 to clutch disengaged position.

To insure that bracket plate 89 is fixedly held in proper position, it is provided with upstanding keys or lugs 93 adapted to engage in associated recesses in the under end of stub shaft 83. The end of spring 44 opposite to that connected to lug 92 is attached to upper leg portion 39 of clutch yoke member 36 by means of a pin 94. An adjustable abutment screw 96 is provided in leg portion 39 to abut lever 81; screw 96 being held in adjusted position by means of a locking pin 97 and engages a wear button 98 in lever 81. It is thus seen that spring 44 while pulling clutch yoke member 36 to disengaged position, also urges such yoke member against lever 81. Hence, movement of lever 81 in a counter-clockwise direction with reference to Fig. 4, will effect movement of clutch yoke member 36 in a direction to engage the clutch.

Figure 5:
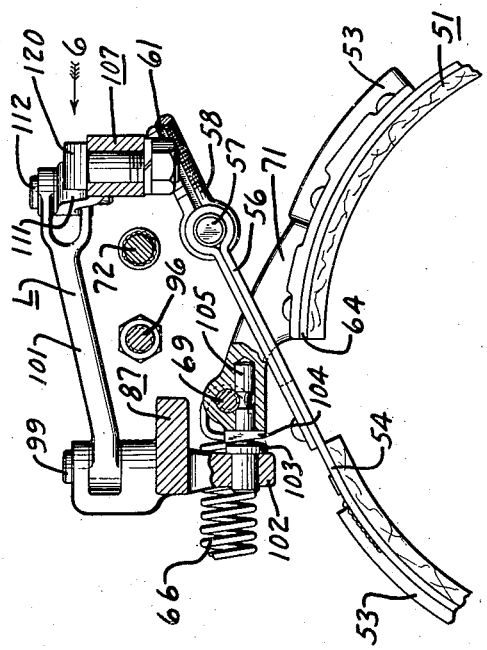
Fig. 5 is a fragmentary section, taken in a plane indicated by line 5—5 in Fig. 4.
Figure 6:
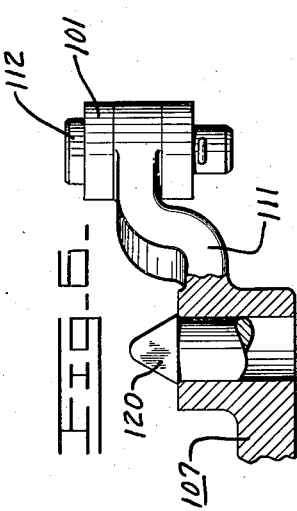
Fig. 6 is a fragmentary elevation looking in the direction of arrow 6 in Fig. 5; a portion of the structure being shown in section to illustrate the construction more clearly.

At its front end, arm 87 is pivotally connected at 99 to a front transversely extending link 101, and is provided with a downwardly extending abutment leg 102 abutting an end of the previously mentioned bracket 71 secured to end 64 of brake band 51. Thus, spring means 66 which serves to maintain brake band 51 engaged, will also cause engagement between the non-anchored end of such band and arm 87, as is illustrated more clearly in Fig. 5. A wear button 103 is provided in abutment leg 102 to engage an associated wear button 104 in bracket 71; the latter wear button being formed at the end of a pin 105 held in position by means of the previously mentioned spring anchoring pin 69.

Movably supported by lever 81 on a forwardly projecting boss 106 at the right end of the lever is a bell-crank lever 107 journalled about a pivot pin 108 mounted on boss 106. One arm 109 of bell-crank 107, extending in the direction of lever 81, provides the previously mentioned pivotal connection 73 for the rear end of rod 72; while the other arm 111 of bell-crank 107, extending transversely with respect to lever 81, is pivotally connected at 112 to the right-hand end of link 101. At its rear side, bell-crank arm 109 is provided with an abutment face 113 adapted to engage a similar abutment face 114 on lever 81, when the bell-crank is urged in a counter-clockwise direction by control member 72; and a rearwardly projecting lug 116 on the bell-crank, having abutment face 117, is adapted to engage an abutment face 118 at the right end of lever 81 when the bell-crank is urged in a clockwise direction by control member 72.

The members of control linkage mechanism L occupy the position illustrated in Fig. 4 when in neutral, i. e., when the brake engages drum 27 and the clutch is disengaged. In such neutral position, the load connected to associated drum 2 will be held against slippage, in any adjusted position thereof, because of engagement of the brake. When it is desired to raise such load, the operator moves control handle 74 to the left with reference to Fig. 4 which results in control rod 72 being moved forwardly. Spring means 66, which holds the brake engaged in the neutral position and which also urges link 101 to the neutral position by virtue of thrust against abutment leg 102 on arm 87 connected to link 101, is of such caliber as to preclude movement of the pivotal connection 99 between arm 87 and link 101, by the manual force required initially to move control rod 72 forwardly. Since pivot 83 is fixed, such initial forward movement of control rod 72, will cause bell-crank 107 and lever 81 to move simultaneously as a unit, about pivot 83 in a counter-clockwise direction. Consequently, clutch yoke member 36 will be moved forwardly, by virtue of engagement between lever 81 and upper leg 39 of such yoke member, which is the direction of movement thereof for engagement of the clutch.

Immediately upon full engagement of the clutch, the lever 81 and the leg 39 of clutch yoke member 36 can not be moved further, forwardly, upon continued forward movement of control rod 72, inasmuch as the fully engaged clutch acts as a stop. Hence, continued forward movement of rod 72 after full engagement of the clutch, with a force sufficient to overcome that of spring means 66, will result in independent pivoting of bell-crank 107 in a clockwise direction about pivot 108 which becomes fixed by virtue of the fact that movement of lever 81 is arrested. This results in link 101 being moved to the right, with consequent pulling of arm 87 in a clockwise direction to act against spring means 66, and hence actuate brake band 51 to released position against the action of such spring means 66. The extent to which the brake is released is determined by the stop which obtains when abutment face 117 on bell-crank lug 116 engages abutment face 118 on lever 81. From the preceding, it is seen that just after the clutch is engaged to raise the load, the brake will become positively released, thus obviating frictional drag and minimizing wear as well as saving power. After the load has been lifted to the desired extent, disengagement of the clutch is effected by releasing the associated control handle 74, thus releasing the tension on spring means 66, which causes control rod 72 to move rearwardly to its neutral position. In this connection, the brake will become automatically engaged just before the clutch is disengaged, thus obviating slippage of the load.

In the described linkage system L, it is to be noted that arm 87 serves primarily as a guide to maintain proper engagement of point 99 with respect to resilient means 66 because link 101 is the element which pulls against the resilient means to actuate the brake to released position when it is moved to the right by pivoting of bell-crank 107; such link 101 being urged to the neutral position by the resilient means. In this connection, arm 87 could be omitted and an abutment corresponding to member 102 could be formed directly on link 101 to act in cooperation with resilient means 66, provided movement of link 101 were properly guided by other suitable means, such as a rail type of guide.

When the load is held in a fixed position and it is desired to spool out the load, namely, to lower it merely under the action of gravity, rod 72 is moved rearwardly by control handle 74, from the neutral position shown in Fig. 4. Such rearward movement will cause both bell-crank 107 and lever 81 to pivot as a unit in a clockwise direction about pivot 83 by virtue of engagement between abutting faces 113 and 114. This will result in movement of link 101 to the right to disengage the brake positively, without effecting engagement of the clutch because the clutch can only be engaged when yoke member 36 is moved forwardly. As a result, the load will lower under the effect of gravity.

It is desirable to have cable drum 2 freely rotatable when the cable is initially threaded onto the drum. For this purpose, latching means is preferably provided to hold the brake in released position when the clutch is not engaged. Such latching means comprises a spring pressed dog 119 mounted on housing structure 3, which is adapted to engage the front of a button 120 on bell-crank 107 when the control linkage is moved rearwardly to its fullest extent for merely releasing the brake. The cooperating faces of dog 119 and button 120 are preferably inclined to enable the button to be moved past the dog in either direction.

The various positions which the members of the left-hand control linkage assume, are illustrated at the left in Figs. 4, 9, 10 and 11. As was previously related, Fig. 4 shows the position of the linkage members in neutral, i. e., when the clutch is disengaged and the brake engaged to hold the load in a fixed position. In the position of Fig. 9, the clutch is just engaged and the brake just about to be released; while the linkage members in Fig. 10 are in the position where the clutch is engaged for lifting the load and the brake is positively released. With reference to the position of the linkage illustrated by Fig. 11, control rod 72 has been moved rearwardly (in a direction opposite to the forward movement of Figs. 4, 9 and 10) to release the brake positively without effecting engagement of the clutch; so that the load may lower under the action of gravity. When it is desired to lower the load by gravity action, the operator generally manipulates control handle 74 by playing it back and forth so that the load may be lowered gradually and thereby avoid undue strain on the mechanism.

As was previously related, control linkage L for the right-hand cable drum mechanism is exactly the same in principle as that for the left-hand mechanism already described. However, in order that control handles 74 may be both manipulated in the same directions for producing the same effects, the right-hand control linkage L is of a slightly different form. The same members, in so far as function is concerned, are employed in the right-hand control linkage as are utilized in the left-hand control linkage. Therefore, to facilitate the description of such right-hand control linkage, the parts thereof and mechanism associated therewith, which are specifically mentioned hereafter and correspond to similar elements of the left-hand mechanism, will be designated by the same reference numerals as those of the left-hand control linkage, but will be distinguished by being primed. Other parts and associated mechanism not specifically mentioned, are indicated by unprimed reference numerals corresponding to the unprimed numerals applied to corresponding elements of the left-hand mechanism.

Lever 81' has an intermediate hub 82' pivoted to move about fixed stub shaft 83'. The right-hand portion of lever 81' projects beyond pivot shaft 83' and is adapted, upon forward movement thereof, to move the right-hand upper leg 39' of the clutch yoke member, to effect engagement of the clutch. Pivotally mounted about the same pivot shaft for lever 81' is guide arm 87' having hub 88' journalled about hub 82'. Lever 81' and arm 87' are mounted in the same manner as the mounting for lever 81 and arm 87. Such mounting includes fixed bracket plate 89' having anchoring lug 92' for the spring 44' which serves as a restoring spring to prevent drag of the clutch plates when the clutch is disengaged. The forward end of arm 87' engages the brake band for effecting release of the brake against the action of spring means 66', in the same manner as arm 87.

Pivotally connected to arm 87' at 99', is link 101'; and bell-crank 107' is pivotally connected at 108' to the left end of lever 81'. The rear arm 109' of bell-crank 107' is pivotally connected, at 73', to control rod 72', while the other arm 111' of such bell-crank 107' is pivoted to the left-hand end of link 101', at 112'. Lower arm 109' of bell-crank 107' lies underneath lever 81' and has an end 121, the opposite side faces 113' and 117' of which are adapted to serve as stops for engaging faces 114' and 118' formed on the under-side of lever 81'; such stops performing the same function as the previously described stop means 113, 114 and 117, 118, respectively.

Rearward movement of control rod 72' is the direction for engaging the clutch, while forward movement is that for releasing the brake only. Hence, front stop face 114' on lever 81' is adapted to be engaged by end 121 of bell-crank arm 109' to effect release of the brake when control rod 72' is moved forwardly; and rear stop face 118' on such lever is adapted upon rearward movement of control rod 72', to be engaged by abutment end 121 of bell-crank arm 109' to serve as a limit stop for limiting the extent of release of the brake after the clutch is engaged. For latching the brake in released position, the right-hand end of lever 81' is provided with tapered button 120' adapted to be held by snap dog mechanism 119' in the manner already related.

Referring to Figs. 4, 9, 10 and 11, the right-hand control linkage is shown in neutral in Fig. 4. In Figs. 9, 10 and 11, such right-hand control linkage are in the same positions, as the members of the left-hand control linkage already described with reference to such figures.

We claim:

1. Mechanism operable to actuate a plurality of devices upon movement of a control member comprising a linkage system including a movably mounted lever and a second lever movably supported by the first mentioned lever so as to be capable of movement independently of such first mentioned lever and having an arm to which the control member is movably connectible for actuating such devices in sequence when the control member is moved in one direction.

2. Mechanism operable to actuate a plurality of devices upon movement of a control member comprising a linkage system including a movably mounted lever and a bell-crank pivotally supported by the lever for movement relative thereto and to which the control member is connectible to actuate such devices in sequence when the control member is moved in one direction and actuate less than said plurality of devices when the control member is moved in an opposite direction.

3. The combination with a device which includes resilient means and is actuatable against such resilient means, and another actuatable device which includes relatively movable parts; of control mechanism associated with such devices comprising a lever having a pivotal mounting and which is movable in one direction about such pivotal mounting to engage the parts of the second mentioned devices, a bell-crank pivotally supported by the lever, and a link member pivotally connected to one arm of the bell-crank and which is urged to a neutral position by the resilient means of the first mentioned device but which when moved in one direction from such neutral position works against such resilient means; and an axially movable rod pivotally connected to the other arm of the bell-crank which upon movement thereof in one direction causes simultaneous movement of the lever and the bell-crank to engage the parts of the second mentioned device, and upon engagement of such parts effects independent movement of the bell-crank for actuating the first mentioned device against its resilient means.

4. The combination with a device which includes resilient means and is actuatable against such resilient means, and another actuatable device which includes relatively movable parts; of control mechanism associated with such devices comprising a lever having a fixed pivotal mounting and which is movable in one direction about such pivotal mounting to engage the parts of the second mentioned device, a bell-crank pivotally supported by the lever, and a link member pivotally connected to one arm of the bell-crank and which is urged to a neutral position by the resilient means of the first mentioned device but which when moved in one direction from such neutral position works against such resilient means; and an axially movable rod pivotally connected to the other arm of the bell-crank which upon movement thereof in one direction causes simultaneous movement of the lever and the bell-crank to engage the parts of the second mentioned device, and upon engagement of such parts effects independent movement of the bell-crank for actuating the first mentioned device against its resilient means; the rod being movable in an opposite direction for effecting actuation of the first mentioned device against its resilient means.

5. A power control unit comprising a housing structure, a cable winding and unwinding drum supported for rotation by such housing structure, clutch mechanism within the housing structure for driving the drum in one direction when engaged, resiliently held but releasable brake mechanism within the housing structure for holding the drum against rotation when the clutch mechanism is disengaged, the drum being rotatable in an opposite direction under the effect of a load when the clutch mechanism is disengaged and the brake mechanism is released, a control member, and control mechanism within the housing structure including a pivotally mounted lever and a bell-crank pivotally supported by the lever to which the control member is connected and which is movable relative to such lever for first engaging the clutch mechanism to drive the drum and just after the clutch mechanism is engaged positively releasing the brake mechanism when the control member is moved in one direction from a neutral position, such control mechanism being operable to release the brake mechanism when the control member is moved in an opposite direction from such neutral position.

6. Mechanism operable first to engage a clutch to drive a drivable member in a power control unit and just after the clutch is engaged to release positively a brake mechanism for holding such drivable member comprising a linkage system associated with the brake mechanism and the clutch and including a pivotally mounted lever, a bell-crank pivotally connected to the lever and movable relative thereto, and means for actuating such linkage system including an axially movable rod pivotally connected to the bell-crank.

7. Mechanism operable first to engage a clutch to drive a drivable member in a power control unit and just after the clutch is engaged to release positively a brake mechanism for holding such drivable member comprising a pivotally mounted lever, a bell-crank pivotally connected to the lever, and an axially movable rod pivotally connected to the bell-crank, said mechanism being operable to release the brake mechanism when the rod is moved in a direction opposite to that for effecting engagement of the clutch.

8. Control mechanism operable to actuate a plurality of devices in a predetermined order comprising a lever mounted for pivotal movement and which upon movement thereof is adapted to actuate one of such devices; and means for actuating another of such devices when movement of said lever is arrested comprising a bell-crank pivotally connected to the lever for movement relative thereto, a link pivotally connected to one arm of the bell-crank, and an arm pivotally connected to the link.

9. Control mechanism operable to actuate a plurality of devices in a predetermined order comprising a lever mounted for pivotal movement and which upon movement thereof is adapted to actuate one of such devices; and means for actuating another of such devices when movement of said lever is arrested comprising a bell-crank pivotally supported by the lever for movement relative thereto and having an arm extending transversely with respect to the lever, a link pivotally connected to such arm, and an arm pivotally connected to the link.

10. Mechanism operable to actuate a plurality of devices in a predetermined order comprising a lever mounted for pivotal movement about a fixed pivot and which upon movement thereof is adapted to actuate one of such devices; and means for actuating another of such devices when movement of said lever is arrested comprising a bell-crank pivotally supported by the lever for movement relative thereto and having an arm extending transversely with respect to the lever and another arm, a link pivotally connected to the transversely extending arm, an axially movable rod pivotally connected to the other arm of the bell-crank, and an arm pivotally mounted adjacent one end thereof and pivotally connected to the link adjacent the opposite end thereof.

11. Mechanism operable to actuate a plurality of devices upon movement of a control member comprising a linkage system including a movably mounted lever, and a second lever pivotally connected to the first mentioned lever so as to be capable of movement independently of such first mentioned lever and having an arm extending in the direction of the first mentioned lever and which is movably connectible to said control member to actuate such devices in sequence when the control member is moved in one direction and actuate less than said plurality of devices when the control member is moved in an opposite direction.

JOHN W. BRIDWELL.
JOHN E. JASS.